(12) United States Patent
DiFazio et al.

(10) Patent No.: US 8,181,796 B2
(45) Date of Patent: May 22, 2012

(54) RACK ASSEMBLY FOR SHIPPING GLASS PANELS

(75) Inventors: Mauro DiFazio, Broken Arrow, OK (US); Monica Puckett, Tulsa, OK (US); James P. Bean, Tulsa, OK (US)

(73) Assignee: Zeledyne, LLC, Allen Park, MI (US)

( * ) Notice: Subject to any disclaimer, the term of this patent is extended or adjusted under 35 U.S.C. 154(b) by 377 days.

(21) Appl. No.: 12/500,698

(22) Filed: Jul. 10, 2009

(65) Prior Publication Data

US 2011/0006020 A1    Jan. 13, 2011

(51) Int. Cl.
*A47G 19/08* (2006.01)
(52) U.S. Cl. .................................................. 211/41.14
(58) Field of Classification Search .............. 211/41.14, 211/207, 189, 182, 175, 195, 191, 208; 206/454, 206/448; 220/6
See application file for complete search history.

(56) References Cited

U.S. PATENT DOCUMENTS

| | | | | |
|---|---|---|---|---|
| 865,268 A * | 9/1907 | Powell | | 211/27 |
| 3,861,695 A * | 1/1975 | Shourek et al. | | 280/5.24 |
| 4,010,848 A * | 3/1977 | Pater et al. | | 206/448 |
| 4,512,473 A * | 4/1985 | Thomaswick et al. | | 206/454 |
| 4,555,029 A * | 11/1985 | Fiol | | 211/22 |
| 4,699,280 A * | 10/1987 | Hoss | | 211/195 |
| 4,757,769 A * | 7/1988 | Suttles | | 108/190 |
| 4,805,787 A * | 2/1989 | Gillotte | | 211/191 |
| 4,955,490 A * | 9/1990 | Schafer | | 211/187 |
| 4,978,014 A * | 12/1990 | Humitz et al. | | 211/195 |
| 5,016,893 A * | 5/1991 | Hart, Jr. | | 280/35 |
| 5,145,073 A * | 9/1992 | Kitagawa et al. | | 211/41.14 |
| 5,439,152 A * | 8/1995 | Campbell | | 224/405 |
| 5,520,316 A * | 5/1996 | Chen | | 224/539 |
| 5,603,419 A * | 2/1997 | Peterson | | 211/195 |
| 5,676,066 A * | 10/1997 | Cavalier et al. | | 108/55.1 |
| 5,884,778 A * | 3/1999 | Freiheit | | 211/41.14 |
| 6,123,208 A * | 9/2000 | Haenszel | | 211/175 |
| 6,126,053 A * | 10/2000 | Shaver | | 224/509 |
| 6,422,405 B1 * | 7/2002 | Haenszel | | 211/175 |
| 6,517,134 B2 * | 2/2003 | Armstrong | | 296/3 |
| 7,080,640 B2 * | 7/2006 | Sanders et al. | | 126/30 |
| 7,104,582 B2 * | 9/2006 | Morrison | | 296/37.5 |
| 7,270,236 B2 | 9/2007 | Angeletti et al. | | |
| 7,510,091 B2 | 3/2009 | Sollers | | |
| 7,641,063 B2 * | 1/2010 | Wishart et al. | | 211/189 |
| 7,802,526 B2 * | 9/2010 | Brady et al. | | 108/53.5 |
| 2005/0045512 A1 | 3/2005 | Carroll, Jr. | | |

* cited by examiner

*Primary Examiner* — Jennifer E. Novosad
(74) *Attorney, Agent, or Firm* — MacMillan, Sobanski & Todd, LLC

(57) ABSTRACT

A rack assembly for shipping glass panels includes a base assembly, a deck assembly operatively carried by the base assembly, at least four end insert members operatively carried by the base assembly, at least four vertical assemblies operatively carried by the four end insert members, and at least two brace members. A first one of the brace members is operatively carried by a first pair of the vertically adjustable assemblies, and a second one of the brace members is operatively carried by a second pair of the vertically adjustable assemblies. The vertical assemblies are vertically adjustable relative to the end insert members so as to operatively adjust a height of the rack assembly to a preselected height. The deck assembly and the two brace members are selected from a group consisting of at least two different sizes of the deck assemblies and at least two different sizes of the brace members to be used so as to operatively adjust a width of the rack assembly to a preselected width.

17 Claims, 4 Drawing Sheets

RACK ASSEMBLY FOR SHIPPING GLASS PANELS

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to the shipping of glass panels, such as used in the manufacture of automotive windows and windshields, and, more specifically, to a rack assembly for shipping the glass panels that are used to manufacture such windows and windshields.

Automotive glass panels, such as glass panels used to manufacture automotive windows and windshields, are typically shipped from the glass supplier to the glass manufacturer in shipping containers or rack assemblies. A typical rack assembly is selected depending upon the particular size of the automotive glass to be shipped and formed from steel members, usually square and/or angle shaped steel, which are welded together to define a fixed or non-adjustable rack assembly. The bottom or base portion of the rack assembly usually carries a plurality of wooden boards. The glass panels are loaded onto the rack assembly and then wrapped and/or "metal" banded to secure the glass panels therein. Wood boards and/or cardboard, foam, or other materials may be used in the securing of the glass panels to the rack assembly. The glass panel loaded rack assembly is then loaded onto a trailer or rail car and transported to a manufacturing plant and removed from the rack assembly. The unloaded rack assembly is then shipped back on the trailer or rail car to the manufacturer for use again.

Unfortunately, since the rack assembly is non-adjustable it is made to carry the largest sized automotive glass panel, i.e., windshield glass used to manufacture the windshield or the windshield itself. Thus, when the rack assembly is used to carry smaller sized automotive glass, i.e., smaller windshield/window glass used to manufacture the windshield/window, the rack assembly is oversized. This results in a wasteful or inefficient shipping of the automotive glass panels in terms of the utilization of the space of the rack assembly and the increased costs associated therewith. Also, since the rack assembly is fixed (i.e., cannot be broken down), after the glass is unloaded and the rack assembly is returned to the supplier the unloaded rack assembly occupies the same amount of space that it occupied when it was loaded. Thus, it can be seen that returning of the unloaded rack assembly also is wasteful and inefficient. Therefore, it would be desirable to provide a rack assembly which when loaded could efficiently ship the outboard glass panels and which when unloaded could efficiently be returned for loading again.

SUMMARY OF THE INVENTION

The present invention provides a rack assembly for shipping of automotive glass panels which is readily and easily adjustable to accommodate different sizes of glass panels for shipping and then, after the glass panels are unloaded, is readily and easily collapsible for subsequent return thereof. The rack assembly reduces shipping costs and lowers expenditures associated with the shipping of the loaded rack assemblies and also the return of the empty racks assemblies themselves.

In one aspect of the invention, a rack assembly adapted for shipping glass panels comprises: a base assembly; a deck assembly operatively carried by the base assembly; at least four end insert members operatively carried by the base assembly; at least four vertical assemblies operatively carried by the four end insert members; and at least two brace members, a first one of the at least two brace members operatively carried by a first pair of the at least four vertically adjustable assemblies and a second one of the at least two brace members operatively carried by a second pair of the at least four vertically adjustable assemblies; wherein the at least four vertical assemblies are vertically adjustable relative to the at least four end insert members so as to operatively adjust a height of the rack assembly to a preselected height, and wherein the deck assembly and the two brace members are selected from a group consisting of at least two different sizes of the deck assemblies and at least two different sizes of the at least two brace members to be used so as to operatively adjust a width of the rack assembly to a preselected width.

According to another aspect of the invention, an adjustable and collapsible rack assembly adapted for shipping glass panels comprises: a base assembly; a deck assembly operatively carried by the base assembly; a plurality of end insert members operatively carried by the base assembly; a plurality of vertical assemblies operatively carried by the plurality of the end insert members; and at least two brace members, a first one of the at least two brace members operatively carried by a first pair of the plurality of the vertical assemblies and a second one of the at least two brace members operatively carried by a second pair of the plurality of the vertical assemblies; wherein the plurality of the vertical assemblies are vertically adjustable relative to the plurality of the end insert members so as to operatively adjust a height of the rack assembly to a preselected height, and wherein the deck assembly and the two brace members are selected from a group consisting of at least two different sizes of the deck assemblies and at least two different sizes of the at least two brace members to be used so as to operatively adjust a width of the rack assembly to a preselected width; and wherein each of the base assembly, the deck assembly, the plurality of the end insert members, the at least two brace members, and the plurality of the vertical assemblies is a separate component capable of being disconnected from one another so as to allow the rack assembly to be easily disassembled and broken down.

According to still a further aspect of the invention, a method of packing automotive glass panels in a rack assembly comprises the steps of: (a) providing a plurality of automotive glass panels which when stacked define an overall width and height; (b) providing a rack assembly having a base assembly, a deck assembly operatively carried by the base assembly, at least four end insert members operatively carried by the base assembly, at least four vertical assemblies operatively carried by the four end insert members, at least two brace members, a first one of the at least two brace members operatively carried by a first pair of the at least four vertical assemblies and a second one of the at least two brace members operatively carried by a second pair of the at least four vertical assemblies, wherein the at least four vertical assemblies are vertically adjustable relative to the at least four end insert members so as to operatively adjust a height of the rack assembly to a preselected height, wherein the deck assembly and the at least two brace members are selected from a group consisting of at least two different sizes of deck assemblies and at least two different sizes of at least two brace members so as to operatively allow a width of the rack assembly to be adjusted to a preselected width based upon the overall width of the stacked automotive glass panels, and wherein the base assembly, the at least four end insert members, and the at least four vertical assemblies are common members; (c) at least partially assembling the rack assembly by releasably attaching the deck assembly to the base assembly, at least two of the four end insert members to the base assembly, at least two of the four vertical assemblies to the at least two of the four end insert members, and one of the at least members to the at least two of the four vertical assemblies; (d) loading the automotive glass panels onto the at least partially assembled rack assembly; and (e) completing the assembly of the rack assembly by releasably attaching the other two of the at least four end inserts to the base assembly, the other two of the at least four vertical assemblies to other two of the at least four end insert members, and the other one of the at least brace members to the other two of the at least four vertical assemblies to complete the assembly of the rack assembly if not completed above in the step (c).

Other advantages of this invention will become apparent to those skilled in the art from the following detailed description of the preferred embodiments, when read in light of the accompanying drawings.

DETAILED DESCRIPTION OF THE INVENTION

Figure 1:
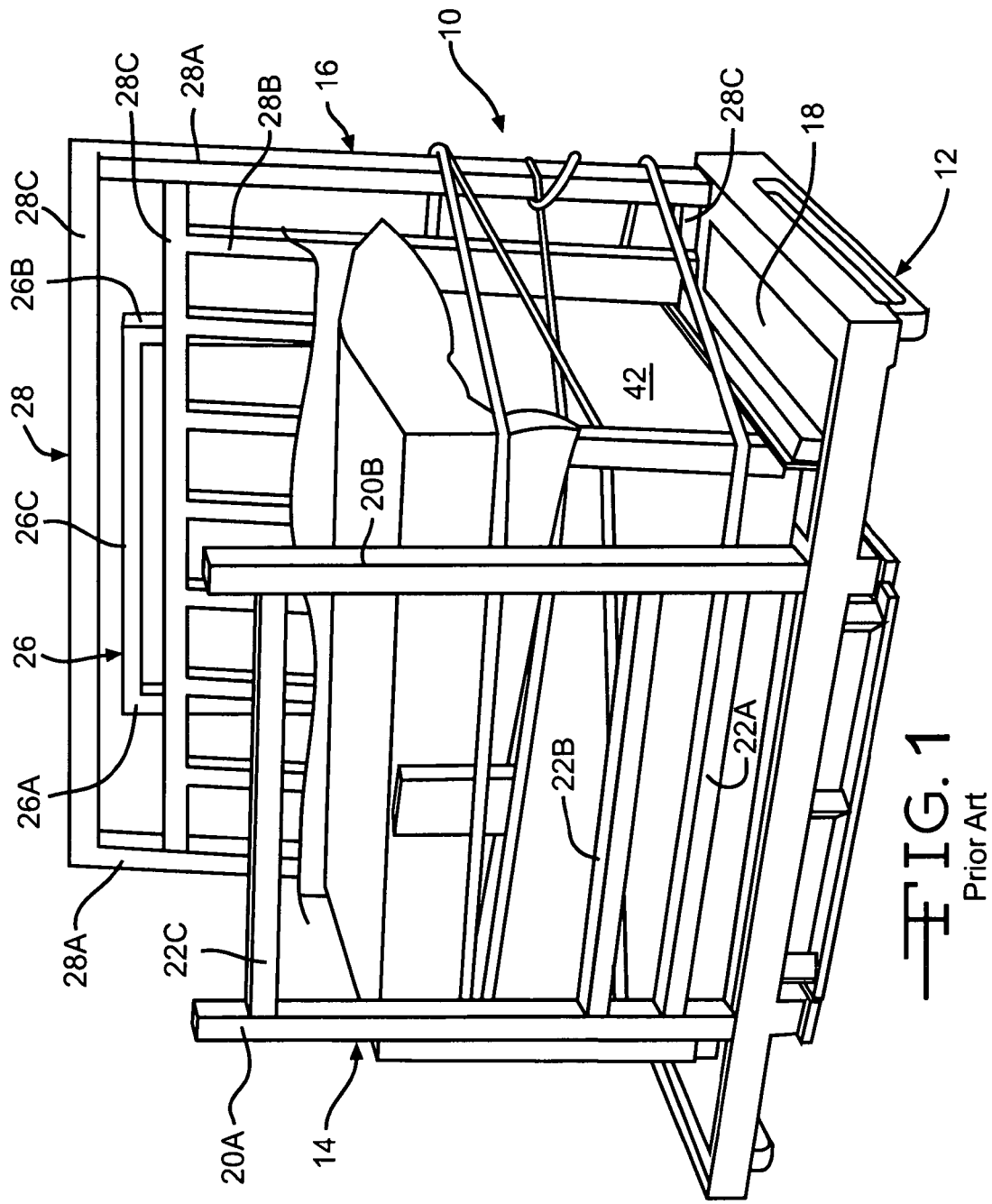
FIG. 1 is a perspective diagram showing a prior art rack assembly, the rack assembly having glass panels loaded onto and secured thereto.

Referring now to prior art FIG. 1, there is illustrated a prior art rack assembly, indicated generally at 10. As shown therein, the prior art rack assembly 10 is a generally metal frame assembly and includes a base 12, a first or "front" side 14, and a second or "back" side 16. The base 12 carries a plurality of wooden boards 18 thereon. The front side 14 is releasably secured to the base 12 and includes a pair of vertical members 20A and 20B and three horizontal members 22A-22C. The vertical members 20A and 20B and the horizontal members 22A-22C are all secured to one another by welding.

The back side 16 of the rack assembly 10 is fixedly secured to the base 12 by welding and includes a first portion, indicated generally at 26, and a second portion, indicated generally at 28, which is spaced inwardly from the first portion 26 toward the front side 14 of the rack assembly 10. The first portion 26 includes a pair of vertical members 26A and 26B which are oriented perpendicular to the base 12, and a horizontal member 26C which is joined by welding to vertical member 26A and 26B.

The second portion 28 includes a pair of "end" vertical members 28A, a plurality of "inner" vertical members 28B, and a plurality of horizontal members 28C, which are all joined together by welding. In the prior art rack assembly 10, the second portion 28 of the back side 16 thereof is oriented at an angle of about 7 degrees relative to the first portion 26 to form a "lean back" side for allowing the associated glass panels (not shown) to be leaned back at an angle against the second portion 22 of the back side 16 thereof during loading. The front side 14 and the back side 16 can each include a pair of pins (not shown), respectively, for rack assembly stacking purposes. As can be seen in prior art FIG. 1, the rack assembly 10 includes glass panels, indicated generally at 42, which have been loaded and secured thereto by suitable means. The construction of the prior art rack assembly 10 thus far described is conventional in the art.

Figure 2:
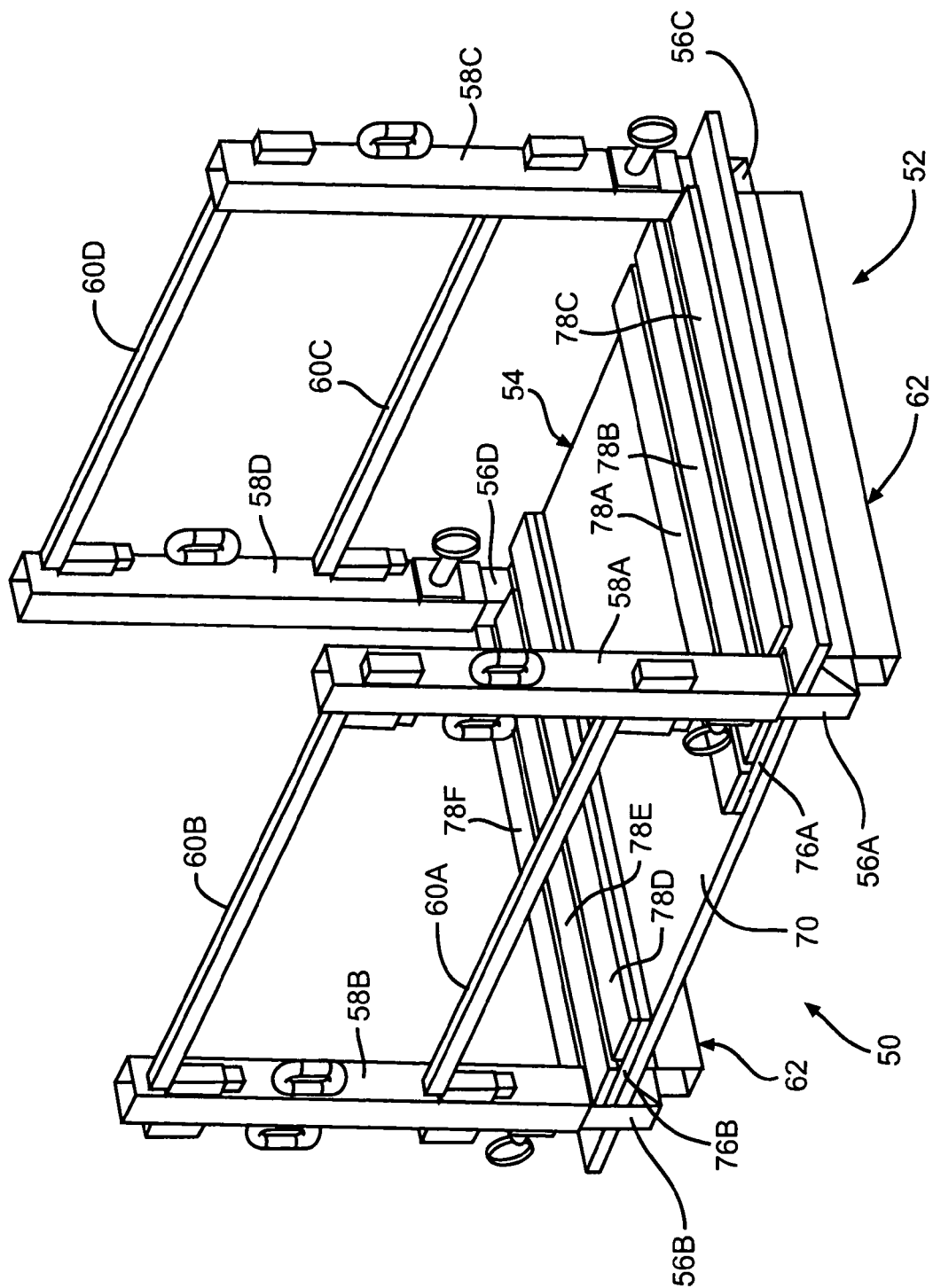
FIG. 2 is a perspective diagram showing a rack assembly of the present invention.

Turning now to FIG. 2, there is illustrated a perspective diagram of a rack assembly, indicated generally at 50, according to an embodiment of the present invention. As shown therein, in the illustrated embodiment the rack assembly 50 includes a base assembly 52, a deck assembly 54 four end insert members 56A-56D, four vertical assemblies 58A-58D, and four horizontal or brace members 60A-60D.

Figure 3:
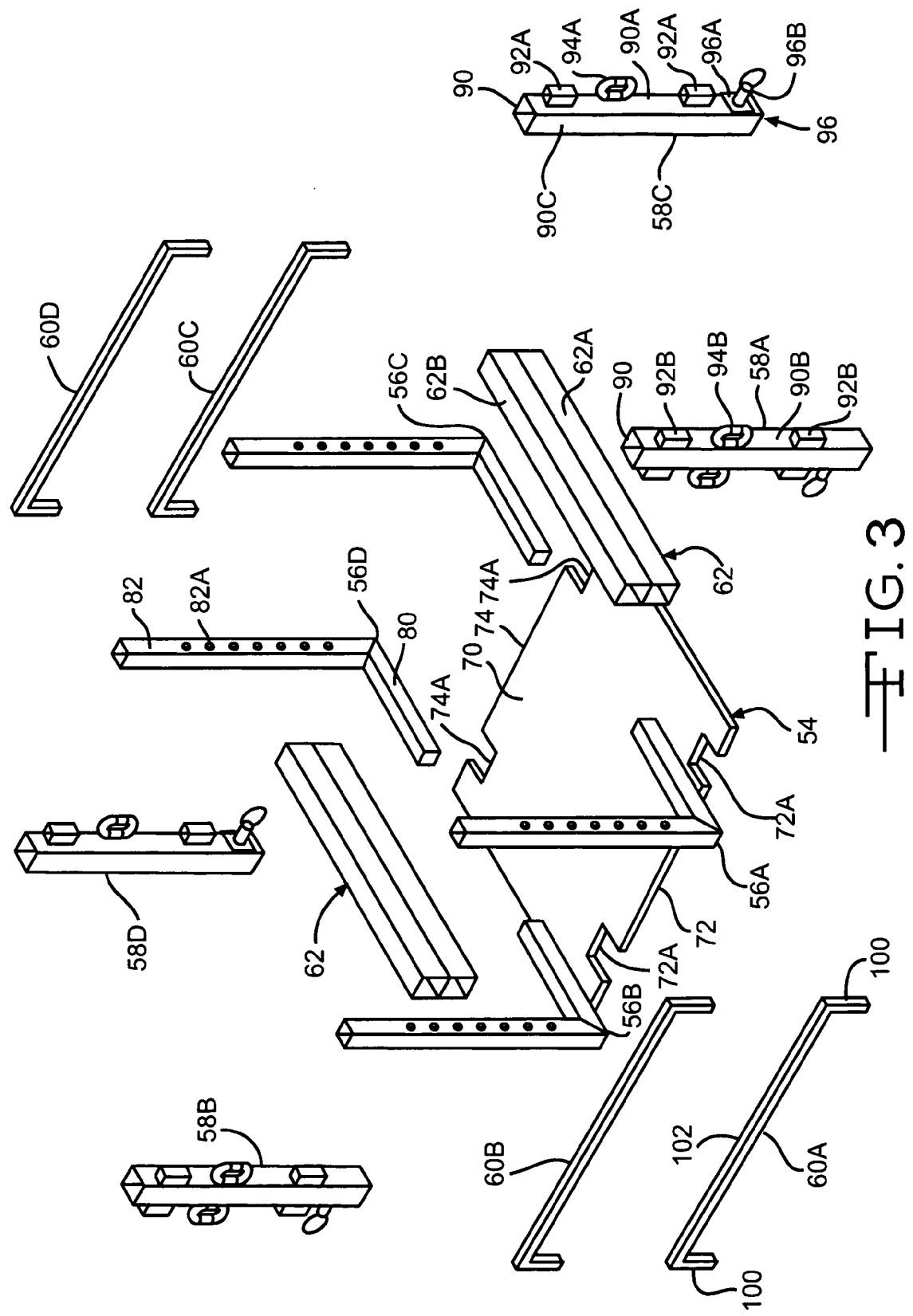
FIG. 3 is an exploded diagram of selected components of the rack assembly illustrated in FIG. 2.

In the illustrated embodiment the base assembly 52 includes a pair of similarly formed base members 62, best shown in the exploded perspective diagram of FIG. 3. As shown therein, each of the base members 62 includes a pair of similarly members 62A and 62B formed from a suitable material. In the illustrated embodiment, each of the members 62A and 62B is formed from a steel square hollow tube. The tubes 62A and 62B are disposed or positioned side by side and secured to one another by suitable means, such as for example, welding. Alternatively, the shape and/or construction of the base assembly 52 may be other than illustrated and described if so desired.

In the illustrated embodiment, the deck assembly 54 is non-adjustable and includes a deck or base 70 (best shown in FIG. 3), a plurality of deck boards 76, and a plurality of pads 78. The deck 70 is formed from a suitable material, such as plywood, and is generally rectangular shaped and defines a horizontal dimension or width W, and includes a pair of cut-outs 72A and 74A on each of two opposite sides 72 and 74, respectively, thereof. In the illustrated embodiment, two deck boards 76A-76B formed from a suitable material, such as wood, and six boards or "board pads" 78A-78F formed from a suitable material, such as for example, Homasote®, are provided and secured to the deck 70 or the boards 76A-76B by appropriate means, such as nailing, screwing and/or gluing. As will be discussed below, in the illustrated embodiment the horizontal size or dimension of the rack assembly 50 may be readily adjusted by selecting a desired width W of the associated deck 70 thereof. Alternatively, the shape and/or construction of the deck assembly 54 may be other than illustrated and described if so desired. For example, the deck assembly 54 may be adjustable by suitable means, so as to be capable of defining at least two different widths.

In the illustrated embodiment, the four end insert members 56A-56D are identical to one another and, as best shown in FIG. 3 in connection with end insert member 56D, are each generally L-shaped and include a first leg 80 and a second leg 82. The first leg 80 is a generally horizontally extending leg and extends a first horizontal distance and the second leg 82 is a generally vertically extending leg and extends vertically a second distance which is greater than the first distance. The first leg 80 and the second leg 82 of each of the end insert members 56A-56D is formed from a suitable material, such as a steel square hollow tube, and are secured together by suitable means, such as for example, welding. As can be readily seen, the first leg 80 of each of the end insert members 56A-56D is telescopingly received in a respective opened end of the associated members 62B of the base members 62.

In the illustrated embodiment, one side of the second leg 82 of each of the end insert members 56A-56D is provided with a plurality of apertures 82A formed therein. In the illustrated embodiment, the one side of the second leg 82 is provided with seven such apertures 82A formed therein. Alternatively, the shape and/or construction of one or more of the end insert members 56A-56D may be other than illustrated and described if so desired. For example, the end insert members 56A-56D may be provided with apertures 82A formed therein on two opposed sides thereof if so desired and/or the number of such apertures 82A may be other than the illustrated seven if so desired.

In the illustrated embodiment, the four vertical assemblies 58A-58D are identical to one another and, as best shown in FIG. 3 in connection with vertical assemblies 58A and 58C, each includes a main vertical member 90, a first pair of spaced apart "brace receiving" sleeves or tubes 92A and a first link member 94A provided on a first side 90A thereof, and a second pair of spaced apart "brace receiving" sleeves or tubes 92B and a second link member 94B provided on a second side 90B thereof. The main vertical member 90 and the sleeves 92A and 92B are formed from a suitable material, such as for example, steel square hollow tube, and the sleeves 92 and 92B are secured to the main vertical members by suitable means, such as for example, welding. As can be readily seen, the main vertical member 90 of each of the four vertical assemblies 58A-58D is telescopingly received about the second leg 82 of each of the four end insert members 56A-56D. Alternatively, the shape and/or construction of one or more of the vertical assemblies 58A-58D may be other than illustrated and described if so desired.

In the illustrated embodiment, each of the vertical assemblies 58A-58D further includes an adjusting member or position locking mechanism, indicated generally at 96, attached to the first side thereof 90A. The adjusting member 96 includes a plate 96A and an adjustable member 96B. In the illustrated embodiment, the adjustable member 96B is illustrated as being a spring-loaded pin 96B. The spring-loaded pin 96B includes a pin portion (not shown) which extends through an opening (not shown) in the plate 96A, through an opening (not shown) provided in the first side 90A of the main vertical member 90, and through a selected one of the openings 82A provided in the second leg 82 of the associated end insert member 56A-56D to thereby adjust the vertical size or dimension of the rack assembly 50. In the illustrated embodiment, each vertical assembly 58A-58D further preferably includes a foam pad (not shown), provided on an "inside" side 90C thereof. Alternatively, the construction and/or configuration of the adjusting member or position locking mechanism 96 may be other than illustrated and described if so desired In the illustrated embodiment, the four brace members 60A-60D are identical to one another and, and as best shown in FIG. 3 in connection with brace member 60A, are each non-adjustable and generally have an elongated U-like shape having a pair of "short" first or end legs 100 connected together by a "long" second or intermediate leg 102. The legs 100 and 102 of each of the brace members 60A-60D are formed from a suitable material, such as a steel square hollow tube, and are secured together by suitable means, such as for example, welding. In the illustrated embodiment, each of the brace members 60A-60D extends an overall horizontal distance D3. As will be discussed below, the horizontal size or dimension of the rack assembly 50 may be readily adjusted by selecting a desired horizontal length of the associated brace members 60A-60D, along with selecting an accompanying corresponding desired size of the deck assembly 54. For example, the brace members 60A-60D may be adjustable by suitable means, so as to be capable of defining at least two different widths.

Preferably, in the illustrated embodiment, for accessibility and ease of loading and/or unloading, preferably one of either the "front" or "rear" walls of the rack assembly 50 is not present. In the illustrated embodiment, the front wall of the rack assembly 50 would include the following components shown on the lower left hand side of FIGS. 2 and 3: the two brace members 60A and 60B, the two vertical assemblies 58A and 58B, and the two end inserts 56A and 56B. Similarly, the rear wall of the rack assembly 50 would include the following components shown on the upper right hand side of FIGS. 2 and 3: the two brace members 60C and 60D, the two vertical assemblies 58C and 58D, and the two end inserts 56C and 56D.

Figure 4:
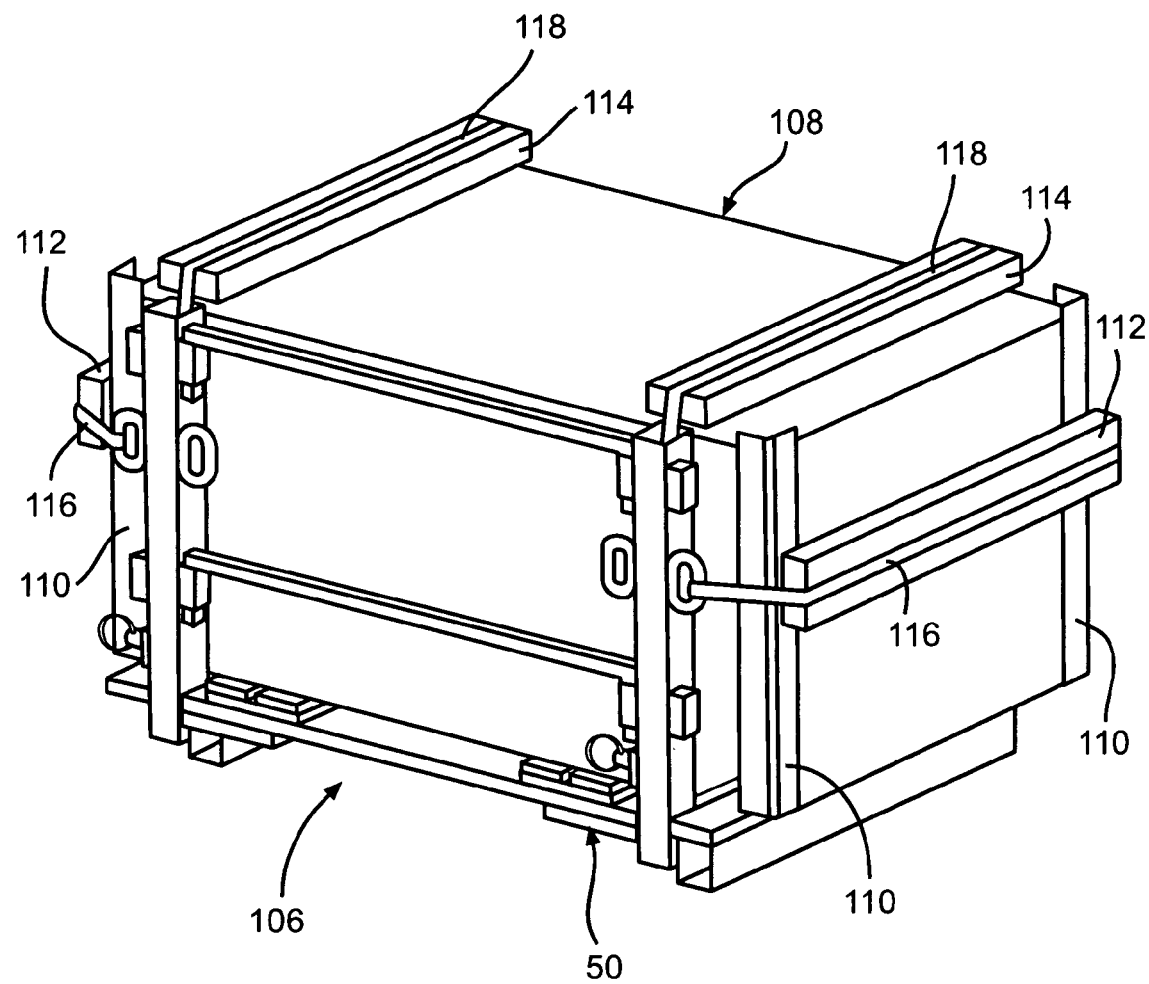
FIG. 4 is a perspective diagram showing glass panels loaded onto and secured to the rack assembly illustrated in FIGS. 2 and 3.

Referring now to FIG. 4, there is illustrated a ready-for-shipping rack assembly, indicated generally at 106, having the rack assembly 50 which has been loaded with glass panels, indicated generally at 108 and which preferably have been stacked vertically, wrapped and banded for shipping. As shown therein, supports 110 are provided at each of the four corners (only three of such supports 110 being illustrated), supports 112 are provided at the two sides, and supports 114 are provided along the top. The supports 110, 112 and 114 can be formed form a suitable material, such as corrugated board or wood. Additionally, banding straps 116 are provided for securing the supports 112, and banding straps are provided 118 for securing the supports 114. For shipping purposes, a loaded, wrapped and banded rack assembly 106 may be stacked one on top of another loaded, wrapped and banded rack assembly 106. Also, the orientation of the glass panels 108 on the rack assembly 50 may be other than vertical, i.e., horizontal, and/or the rack assembly 50 may be used not only for shipping automotive glass panels which are subsequently made into windows and windshields but may be used for shipping the manufactured windows and windshields themselves if so desired.

Alternatively, the construction and/or configuration of the rack assembly 50 may be other than illustrated and described if so desired. However, it is preferred that the rack assembly 50 be readily and easily adjustable in both its width or horizontal dimension and its height or vertical direction to accommodate loading of different sized glass panels. In addition, it is preferred that the rack assembly 50 be readily and easily collapsible or broken down for returning purposes.

One advantage of the present invention is that the rack assembly 50 of the present invention is readily and easily adjustable to accommodate different size automotive glass panels by only having to change the sizes of the component parts of the deck assembly 54 and the brace members 60A-60D thereof. The remaining parts of the rack assembly 50, namely the base assembly 52, the end inserts 56A-56D, and the main vertical assemblies 58A-58D, do not have to be changed to accommodate different size glass panels but in fact are "universal" or common parts which can be used regardless of the particular size of the glass panels. Typically, for automotive glass panels, the rack assembly 50 would be adjustable to provide at least two different sets of widths, such as 31 inch and 42 inch, which would require two different sizes of associated brace members 60A-60D, such as 27.5 inch and 38 inch, respectively, as well as two different sizes of deck assemblies 54, such as 36.75 inch wide and 47.25 inch wide. Additionally, the rack assembly 50 via the adjustability of the vertical assemblies 58A-58D relative to the insert members 56A-56D would be adjustable to provide a plurality of different heights, generally ranging between overall rack heights (e.g., measured from the top of the pads 78A-78F of the deck assembly 54 to the top of the vertical assemblies 58A-58D), of from about 20 inches to about 36 inches. The prior art rack assembly 10 was non-adjustable and came in only the one size which was to accommodate the larger sized windshield glass. Thus, when the prior art rack assembly 10 was used to carry smaller sized automotive window glass, it was wasteful and inefficient in utilization of the space and thereby increased the costs associated therewith in shipping when loaded.

Another advantage of the present invention is that the rack assembly 50 is readily and easily collapsible or broken down by the disassembly of the individual component parts thereof. As a result of this, after the rack assembly have been delivered to the glass manufacturer and unloaded, the rack assembly 50 may be easily and readily broken down for returning back to the glass supplier. Since the space required by the broken down rack assembly 50 is greatly reduced compared to that of the assembled and loaded rack assembly 50, many more broken down rack assemblies 50 can be returned as compared to the number of rack assemblies 50 that were shipped when they were assembled and loaded. As compared to the non-collapsible prior art rack assembly 10, there can be a fifty percent total cost savings on the returning of the rack assemblies 50 of the present invention compared to that of the prior art rack assemblies 10.

Another advantage of the present invention is that the rack assembly 50 is substantially lighter than the prior art rack assembly 10. A similar sized rack assembly 50 of the present invention weighs around fifty pounds compared to a similar sized prior art rack assembly 10 which weighed around 550 pounds. Weight reduction is important because a truck will "weigh out" when it is loaded with loaded rack assemblies. As a result of this reduction in weight of the rack assembly 50 of the present invention itself, about three more loaded rack assemblies can be transported by the truck compared to the number of prior art rack assemblies 10 that can be carried by the truck. For example, a fully loaded prior art rack assembly 10 weighed about 4000 pounds (about 550 pounds for the prior art rack assembly 10 and about 3450 pounds for the glass). Thus, a truck could only carry around 11 loaded prior art rack assemblies 10 or about 44,000 pounds. The rack assembly 50 of the present invention fully loaded weighs about 3500 pounds (carries the same weight of glass of about 3450 pounds but the rack assembly 50 weighs only about 50 pounds), so a truck can carry around 13 fully loaded rack assemblies 50 or about 45,500 pounds. As a result of this, there can be about an 18 percent outboard cost savings on the shipping out of the rack assemblies 50 of the present invention compared to that of the prior art rack assemblies 10.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A rack assembly adapted for shipping glass panels comprising:
    a base assembly;
    a deck assembly operatively carried by said base assembly;
    at least four end insert members operatively carried by said base assembly;
    at least four vertical assemblies operatively carried by said four end insert members; and
    at least two brace members, a first one of said at least two brace members operatively carried by a first pair of said at least four vertically adjustable assemblies and a second one of said at least two brace members operatively carried by a second pair of said at least four vertically adjustable assemblies;
    wherein said at least four vertical assemblies are vertically adjustable relative to said at least four end insert members so as to operatively adjust a height of said rack assembly to a preselected height, and wherein said at least four end insert members are generally L-shaped and include a first leg and a second leg, said first leg extending in a generally horizontal direction and said second leg extending in a generally vertical direction and including, said second leg including at least one side provided with a plurality of apertures formed therein.

2. The rack assembly of claim 1 wherein said base assembly includes at least four openings and each of said at least four end insert members includes a leg which is telescopingly received in a respective one of said openings.

3. The rack assembly of claim 1 wherein each of said at least four vertical assemblies includes an adjusting device which is adapted to be operatively received in a selected one of said plurality of apertures provided in said second leg of said at least four end insert members so as to operatively adjust the height of said rack assembly.

4. The rack assembly of claim 3 wherein said adjusting device is a spring loaded pin assembly.

5. The rack assembly of claim 1 wherein at least four horizontal brace members are provided, said first pair of said at least four vertical assemblies carrying a first pair of said four brace members and said second pair of said at least four vertical assemblies carrying a second pair of said at least four brace members.

6. The rack assembly of claim 1 wherein each of said at least four end insert members includes a leg and each of said at least four vertical assemblies includes an opening formed therein so as to allow said at least four vertical assemblies to be telescopingly received in a respective one of said legs so as to operatively allow the height of said rack assembly to be adjusted.

7. The rack assembly of claim 1 wherein each of said at least four vertical assemblies further includes a link member provided thereon.

8. The rack assembly of claim 1 wherein said base assembly, said at least four end insert members, said at least two brace members, and said at least four vertical assemblies are formed from steel square hollow tube.

9. The rack assembly of claim 1 wherein each of said base assembly, said deck assembly, said at least four end insert members, said at least two brace members, and said at least four vertical assemblies is a separate component capable of being disconnected from one another so as to allow said rack assembly to be easily disassembled and broken down.

10. The rack assembly of claim 1 wherein said base assembly, said plurality of said end insert members, said at least two brace members, and said plurality of said vertical assemblies are formed from steel square hollow tube.

11. An adjustable and collapsible rack assembly adapted for shipping glass panels comprising:
    a base assembly;
    a deck assembly operatively carried by said base assembly;
    a plurality of end insert members operatively carried by said base assembly;
    a plurality of vertical assemblies operatively carried by said plurality of said end insert members; and at least two brace members, a first one of said at least two brace members operatively carried by a first pair of said plurality of said vertical assemblies and a second one of said at least two brace members operatively carried by a second pair of said plurality of said vertical assemblies;

wherein said plurality of said vertical assemblies are vertically adjustable relative to said plurality of said end insert members so as to operatively adjust a height of said rack assembly to a preselected height;

wherein each of said base assembly, said deck assembly, said plurality of said end insert members, said at least two brace members, and said plurality of said vertical assemblies is a separate component capable of being disconnected from one another so as to allow said rack assembly to be easily disassembled and broken down; and wherein said plurality of said end insert members are generally L-shaped and a first leg and a second leg, said first leg extending in a generally horizontal direction and said second leg extending in a generally vertical direction and including, said second leg including at least one side provided with a plurality of apertures formed therein.

12. The rack assembly of claim 11 wherein said base assembly includes at least four openings and each of said plurality of said end insert members includes a leg which is telescopingly received in a respective one of said openings.

13. The rack assembly of claim 11 wherein each of said plurality of said vertical assemblies includes an adjusting device which is adapted to be operatively received in a selected one of said plurality of apertures provided in said second leg of said plurality of said end insert members so as to operatively adjust the height of said rack assembly.

14. The rack assembly of claim 13 wherein said adjusting device is a spring loaded pin assembly.

15. The rack assembly of claim 11 wherein at least four brace members are provided, said first pair of said plurality of said vertical assemblies carrying a first pair of said four brace members and said second pair of said plurality of said vertical assemblies carrying a second pair of said at least four brace members.

16. The rack assembly of claim 11 wherein each of said plurality of said end insert members includes a leg and each of said plurality of said vertical assemblies includes an opening formed therein so as to allow said plurality of said vertical assemblies to be telescopingly received in a respective one of said legs so as to operatively allow the height of said rack assembly to be adjusted.

17. The rack assembly of claim 11 wherein each of said plurality of said vertical assemblies further includes a link member provided thereon.

* * * * *